United States Patent
Jose et al.

(10) Patent No.: US 7,455,332 B2
(45) Date of Patent: Nov. 25, 2008

(54) METHOD FOR CONTROLLING OVERCOAT RECESSION IN A MAGNETIC THIN FILM HEAD

(75) Inventors: Winston Jose, Folsom, CA (US); Rudy Ayala, San Jose, CA (US); Niraj Mahadev, Tracy, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 373 days.

(21) Appl. No.: 11/280,364

(22) Filed: Nov. 16, 2005

(65) Prior Publication Data

US 2007/0109686 A1    May 17, 2007

(51) Int. Cl.
G11B 5/127    (2006.01)
H04R 31/00    (2006.01)

(52) U.S. Cl. .............. 291/603.16; 29/417; 29/603.12; 29/603.13; 29/603.15; 29/603.18; 156/268; 156/344; 360/230; 360/237.1; 438/455; 438/458; 438/976; 451/5; 451/41

(58) Field of Classification Search ............ 29/417, 29/603.09, 603.12–603.16, 603.18; 156/268, 156/344; 360/230–237.1; 438/455, 458, 438/976; 451/5, 41
See application file for complete search history.

(56) References Cited

U.S. PATENT DOCUMENTS

| | | | |
|---|---|---|---|
| 5,271,802 A * | 12/1993 | Chang et al. ............ 216/22 |
| 5,468,177 A | 11/1995 | Kindler et al. .......... 451/364 |
| 5,768,055 A | 6/1998 | Tian et al. ............... 360/103 |
| 5,872,684 A | 2/1999 | Hadfield et al. ......... 360/103 |
| 6,069,770 A | 5/2000 | Cui et al. ................. 360/103 |
| 6,428,715 B1 | 8/2002 | Abels et al. ............... 216/22 |
| 6,441,999 B1 | 8/2002 | Tang et al. .............. 360/236.6 |
| 6,500,049 B2 * | 12/2002 | Orii et al. ................... 451/36 |
| 6,697,221 B2 * | 2/2004 | Sato et al. ............ 360/125.13 |
| 6,712,985 B2 | 3/2004 | Biskeborn ................. 216/22 |
| 6,760,191 B1 | 7/2004 | Yan et al. ................. 360/128 |
| 6,762,909 B2 | 7/2004 | Albrecht et al. ......... 360/97.02 |
| 6,813,118 B2 | 11/2004 | Pust et al. ............... 360/234.5 |
| 6,836,389 B2 | 12/2004 | Macken et al. .......... 360/235.1 |
| 6,842,308 B1 | 1/2005 | Pust et al. ............... 360/234.7 |
| 2003/0006213 A1 | 1/2003 | Biskeborn ................. 216/22 |
| 2003/0067716 A1 | 4/2003 | Chhabra et al. ......... 360/234.5 |
| 2003/0067717 A1 | 4/2003 | Garfunkel et al. ....... 360/234.5 |
| 2003/0128469 A1 | 7/2003 | Pust et al. ............... 360/234.5 |
| 2004/0061974 A1 | 4/2004 | Macken et al. .......... 360/235.1 |

FOREIGN PATENT DOCUMENTS

CH    675353 A5 *    9/1990

\* cited by examiner

*Primary Examiner*—Paul D Kim
(74) *Attorney, Agent, or Firm*—Saile Ackerman LLC; Stephen B. Ackerman

(57) ABSTRACT

The overcoat of a slider (alumina) is recessed relative to the slider ABS by a non-abrasive CMP process sufficiently to prevent thermal protrusion of the overcoat during subsequent slider use in a hard disk drive. The CMP process involves the oscillatory and rotational compressional contact between the ABS surface of the slider and a polymerically pre-treated compliant pad that is sprayed by an aqueous alkali lubricating solution having a pH between about 9 and 10. The overcoat is thereby also softened by the lubricating solution and removed by the compressional contact and no use of abrasives is required.

12 Claims, 2 Drawing Sheets

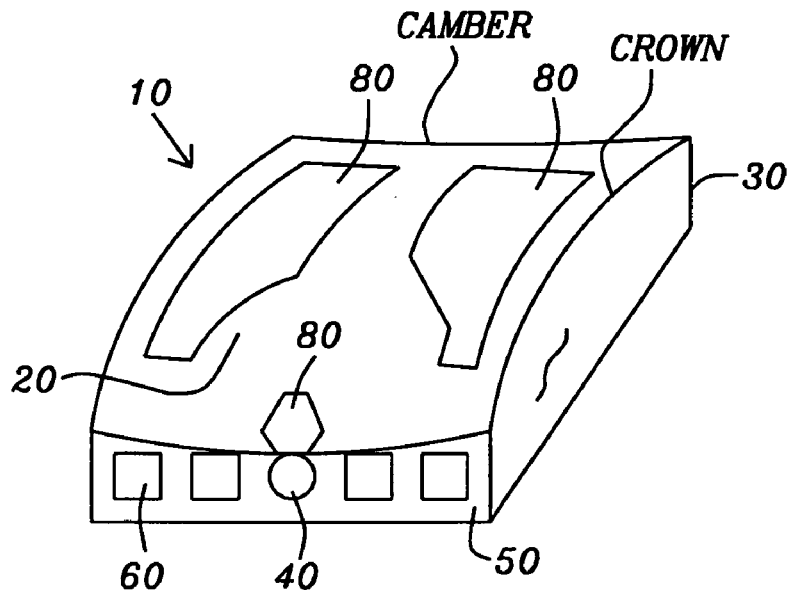
FIG. 1 – Prior Art
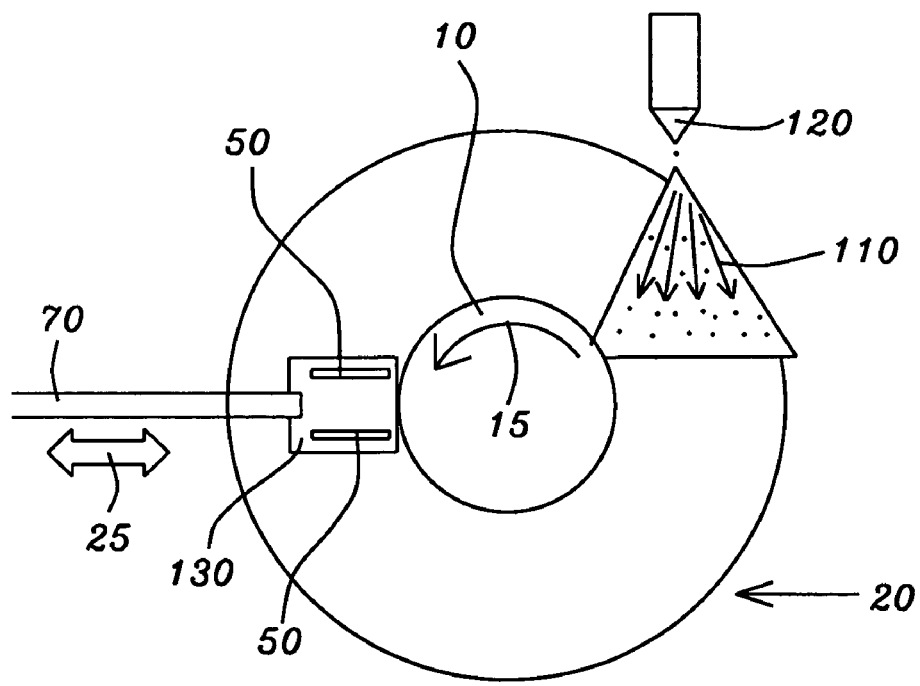
FIG. 2

METHOD FOR CONTROLLING OVERCOAT RECESSION IN A MAGNETIC THIN FILM HEAD

BACKGROUND OF THE INVENTION

1. Field of the Invention

This invention relates to the fabrication of thin film magnetic heads and particularly to a CMP planarization technique for controlling overcoat and pole tip recession of such a head relative to a slider surface.

2. Description of the Related Art

A hard disk drive (HDD) uses an encapsulated thin film magnetic read/write head, called a slider, to read and write data on a magnetic medium or storage disk. FIG. 1 is a schematic illustration of such a device as is used in the prior art and whose improvement is the object of the present invention. The slider (10) has a pre-patterned air-bearing surface (ABS) (20) and is mounted on a head gimbal assembly (HGA) (not shown) that is activated by a mechanism and control circuitry to position the slider at various positions along the magnetic tracks on the disk (not shown). As the disk is rapidly rotated by a spindle motor (not shown), hydrodynamic pressure causes air flow between the ABS of the slider and the surface of the disk. This flow lifts the slider so that it literally flies above the surface of the disk (at a "fly height") on a layer of air. The edge of the slider into which the disk rotates is called its "leading edge (30)," the opposite edge, which contains the read/write head (40), is called the "trailing edge (50)." The read/write head is within the body of the slider and the small region labeled (40) is the area on the surface of the slider at which the active portions of the read/write head intersect the surface. The head itself is below the slider surface and is not shown. Contacts formed at the trailing edge (60) are used to make connections between the read/write head and external circuitry. The aerodynamics of the slider motion lifts the leading edge higher above the rotating disk surface than the trailing edge.

The HGA provides a flexible connection between the slider and a load beam (suspension) allowing the slider pitch and roll capability when fly height is achieved. A pre-load downward force applied by the suspension is used to counteract and control the hydrodynamic lifting force. The position above the disk at which the pre-load downward force and the hydrodynamic upward force are in equilibrium is the targeted fly height of the slider. When a predetermined rotational speed and targeted flying height are achieved, the writing and reading of data commences. As a consequence of higher linear and track densities, the flying height and thus the distance between the read/write head and the storage disk, must be extremely small to ensure accurate transfer of data.

The read and write heads (40) are fabricated as device arrays in wafer form on a ceramic AlTiC (aluminum titanium carbide) substrate (substantially all of (10)) using well known semiconductor deposition techniques such as electroplating, CVD (chemical vapor deposition) and photolithographic patterning and etching. The read sensor portion of the head is typically fabricated as a sequence of magnetoresistive thin films (called an MR sensor). The write head is typically formed as a single electrically conductive coil wound, in two layers, around a yoke. The yoke spans a leading and trailing pole. The coil is typically formed of Cu windings while the poles are formed of a high permeability magnetic material such as NiFe. During the writing of data on the disk, current flows through the coil in alternating directions, which generates a relatively significant amount of heat. This heating affects nearby regions including the poles themselves and the insulating overcoat, which is typically sputtered alumina ($Al_2O_3$). This heating causes the emerging tip of the pole, the shields above and below the pole and read sensor and the surrounding overcoat to expand and protrude above the ABS plane in the direction of the disk surface. This expansion is referred to as thermal pole tip protrusion and overcoat protrusion. In FIG. 1, the pole protrusion would be evidenced within the ABS above region (40), just above the read/write head.

During the write operation, thermal protrusion causes the balanced-force distance between the lowest point on the slider ABS and the disk to be significantly less than the preferred flying height. With flying heights being already extremely low to enable accurate resolution of the narrow disk tracks, thermal protrusion can eventually result in a physical contact between the disk surface and the ABS plane. This contact can move the slider off its target track, can cause damage to the slider assembly, can damage the disk surface and/or cause a permanent loss of data.

The initial step in slider fabrication is the slicing of a wafer into pre-patterned blocks or "quads," (quadrants) which are then further sliced into individual rows containing a horizontal array of read and write sliders. After this cutting is completed, the ABS of the row is polished by lapping to obtain critical dimensional control of the read and write elements as well as for the improvement of the surface finish.

A heating step is then applied to the rows of sliders using a convection oven to induce a thermal protrusion of the overcoat and pole tips. The amount of protrusion is a function of the time duration of the heating process (typically on the order of several hours) and the temperatures that are reached, which are typically in the 100° to 200° C. range.

Following the heating step, a process to control the profile of the ABS surface along its length (crown) and width (camber) is applied to the entire row of sliders. The shape profile of crown and camber are pointed out in FIG. 1. A thin film, diamond-like coating is deposited onto the ABS following this contouring procedure. Using photolithography and ion-beam plasma (IBE) or reactive-ion etching (RIE), the ABS is patterned with an advance air bearing (AAB) design (80) for flying height purposes. The typical final step of slider fabrication, after AAB patterning, is the dicing up of the row to form individual sliders.

As has already been noted, thermal protrusion is a result of the differences in the coefficients of thermal expansion (CTE) of the various materials used in fabricating the slider, the read sensor and the write element. The list below indicates the CTE, in units of $10^{-6}$/K, for the most important materials:

AlTiC: 7.5

$Al_2O_3$: 8

NiFe: 12

Photoresist: 90

Cu: 16.5

The AlTiC makes up the bulk of the slider body as shown in FIG. 1. Sputtered $Al_2O_3$, formed to a thickness of approximately 0.035 mm, forms a nearly transparent insulating coating on the ABS surface over the read and write sensors (located behind the circular region (40) and protruding upward through the ABS). The square regions (60), on the trailing edge of the slider, represent bonding pads for making electrical connections to the sensor elements. The NiFe is a ferromagnetic alloy used to form the pole tips and yoke elements. Photoresist, when hardened by baking, is used to separate coil layers within the yoke and is also used as a base layer on which to form the coils. Cu is the material used to form the coil windings.

It would be extremely advantageous if thermal protrusion could be eliminated during the actual use of the slider within the HDD by a compensating process that occurred during the fabrication of the slider. Several methods taught in the prior art attempt to achieve this object. Abels et al. (U.S. Pat. No. 6,428,715), teaches a method whereby after the lapping of the slider ABS using known techniques, the trailing edge of the slider base is contacted by an aqueous base having a pH of between about 9 and 13. Preferably the pH is between about 10 and 11 and most preferably about 10.6. The base solution is also preferably buffered and is a aqueous solution of an alkali salt of a weak acid such as an alkali carbonate/bicarbonate such as potassium carbonate and potassium bicarbonate or a mixture of sodium borate and sodium hydroxide. The solution also includes a suitable surfactant. The slider or the row of sliders is immersed in a filtered aqueous solution at a temperature between about 15-45 degrees C. for between 5 and 15 minutes, during which time an amount of the alumina overcoat is removed. This process removes the alumina overcoat protrusion without affecting the performance of the magnetic layers or unacceptably etching other portions of the slider.

Biskeborn (U.S. Pat. No. 6,712,985) teaches a method and apparatus for lapping a slider, utilizing a compliant pad covered with a lapping medium and a linearly vibratory lapping process. The lapping medium is a conventional medium (slurry of mechanical agents) to which a dilute acid has been added. The added acidity selectively removes portions of the iron-containing poletips to lower them beneath the ABS of the slider and, thereby, compensate for their thermal protrusion. Within the description of the method, the use of rotating lapping plates in the prior art is discussed and it is noted that they produce problems leading to degraded head performance.

The method taught in the present invention has distinct advantages over the prior art cited above. The objects of the present method and the means of achieving those objects will now be presented.

SUMMARY OF THE INVENTION

The first object of the present invention is to provide a method of fabricating a slider so that thermal protrusion of read/write elements and portions of the slider overcoat relative to the air bearing surface (ABS) during hard disk drive (HDD) operation is eliminated.

A second object of this invention is to provide a method of polishing the ABS of a slider that allows slow, controlled and non-abrasive removal of exposed overcoat layers (eg. alumina overcoat layers) without the use of abrasive lapping compound.

A third object of the present invention is to provide a method of achieving the first two objects while not adversely affecting the performance of the read/write elements within the slider.

A fourth object of the present invention is to provide a method of achieving the first three objects on a slider having an air bearing surface that has already been lapped to a specified surface contour.

A fifth object of the present invention is to provide a method of achieving the first three objects while using a simple CMP process and conventional, commercially available materials.

These objects are all achieved by a CMP (chemical mechanical process) lapping of the slider using a commercially available compliant porous lapping pad. This pad has been impregnated with a polyurethane solution that produces a micro-porous cell structure at its surface. During the lapping process, the pad is wet by being sprayed with an aqueous basic solution. The combination of the physical properties of the pad, the chemical action of the aqueous solution and the method of applying the slider to the pad during the lapping, produces the effects of the invention, which, in the preferred embodiment described below, is the recessing of an aluminum oxide (alumina) overcoat below the slider ABS plane.

This CMP lapping process occurs subsequent to a preliminary contour lapping that shapes and smoothes the ABS surface of the slider, but does not yet recess the alumina overcoat below the ABS plane. The contour lapping process occurs after the row bars are heated in an oven so that thermal protrusion of the overcoat and pole tip is created. The contour lapping then not only shapes the ABS of the slider, it also removes or laps away the protrusions that have been created. Since the lapping rates of the different materials composing the slider are different, the height of the overcoat and pole tip region is recessed about 2-3 nanometers below the AlTiC body of the slider. It is at this point that the additional CMP process is applied. The CMP process of the present invention then actually recesses the alumina overcoat below the ABS plane so that any subsequent thermal expansion of the alumina is compensated for by the already produced CMP recession. The alumina is also further polished by the process. To achieve this carefully controlled polishing and recession of the thin alumina overcoat, without adversely affecting the exposed portions of the sensors, requires a novel CMP method that will now be described.

Looking now at FIG. 2, there is seen a schematic overhead view of the apparatus used to achieve the objects of the present invention. It is assumed that the contour lapping has already occurred. The compliant, porous CMP pad (20) is adhesively bonded to the surface of a rotating lapping baseplate (10) that is partially shown. The curved arrow (15) indicates the rotation direction of the baseplate.

A plurality of row bars, a row bar being an uncut linear array of sliders (50), only two row bars being shown here, is each then mounted on a polyurethane rubber strip (beneath each row bar and invisible in this view) that is affixed to the underside of a weighted lapping fixture (130) positioned above the lapping plate. Note, the row bars are shown here to indicate their orientation, but they would not be seen since they are beneath the fixture. The row bars will be flattened against the fixture for the CMP process, although they may have been slightly curved for the purpose of contour lapping, i.e., forming a crown/camber contour on the ABS, which was carried out before this CMP process. The contour lapping occurs before the CMP process. It is the CMP process that creates the recession of the alumina overcoat on the already contoured sliders.

As will be seen in the following figure, FIG. 3, the ABS of the sliders are all in contact with the surface of the compliant porous CMP pad, compressing the pad (arrows (95) in FIG. 3) because of the weight (arrows, (85) in FIG. 3) of the lapping fixture. Returning to FIG. 2, the lapping fixture is capable of a vibratory translational motion produced by an oscillating guide arm (70), the motion (double ended arrow (25)) being in the radial direction relative to the circular lapping plate. The weighted fixture forces the ABS of each row bar and of the sliders within that row bar into the compliant pad and the pad, thereby conforms to the ABS shape. The sliders are arranged along the row bar so that their lengths, as measured along the crown, are perpendicular to the length of the row bar. The circular lapping plate is then set in rotational motion and the lapping fixture is set into oscillatory motion. During this process, the compliant pad is continuously wet by spraying with an aqueous alkaline solution (110) that acts as an etchant/lubricant that will soften the surface of the slider materials so that they can be removed in conjunction with the lapping/polishing process being produced by the motion of the slider against the rotating compliant pad. The aqueous solution is sprayed from the nozzle (120) of a separate pump and spray unit, mounted in situ, adjacent to the lapping plate. The resulting chemical reaction relies on the pH of the lubricant and the removal rate of the softened material relies on the very slight degree of abrasion resulting from the polymer solution pre-deposited on the pad.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic perspective drawing showing a slider of the type to be processed by the present invention.

FIG. 2 is a schematic overhead view of the apparatus used for achieving the objects of the present invention.

DESCRIPTION OF THE PREFERRED EMBODIMENTS

Figure 3:
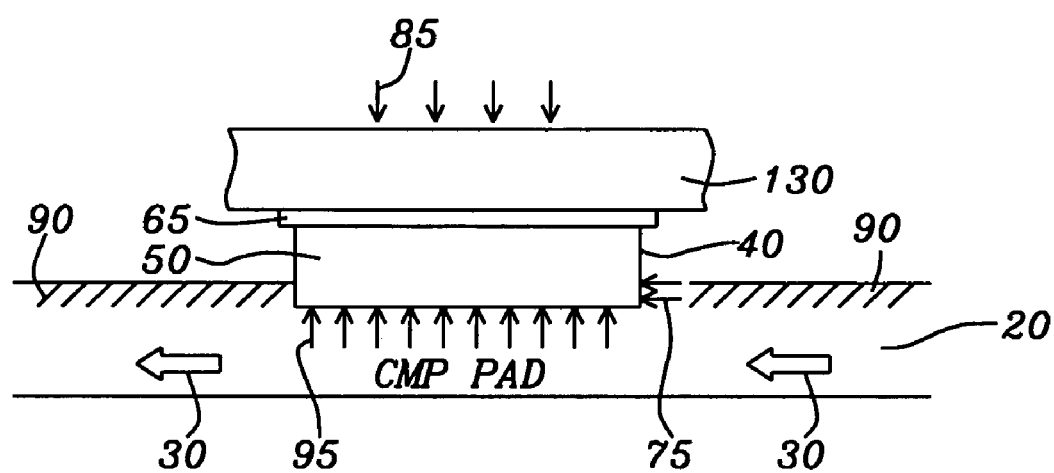
FIG. 3 is a schematic side cross-sectional view of the contact between one slider within a row of sliders and the compliant porous pad of the present invention.

The preferred embodiment of the present invention teaches a method of chemical/mechanical (CMP) polishing the ABS of a slider, using a compliant CMP pad whose surface has been rendered porous and formed into a polymeric matrix by a polymeric pre-treatment. The nature of the pad surface and its pre-treatment is fully described below.

During the application of the process, the compliant porous CMP pad is additionally sprayed with an aqueous alkali lubricant solution. The alkali lubricant softens surface coatings of $Al_2O_3$ that overcoat and cover portions of the slider surface and the moving, compressive contact of the ABS with the surface of the compliant pad is sufficient to remove the softened material in a slow and controlled manner without the use of abrasive polishing compounds. In this way, a controlled recession of the oxide surface coating is obtained and thermal protrusion of the oxide at a later time during actual device operation in a hard disk drive (HDD) is eliminated. Recession of metallic pole tips and shields is primarily obtained by the contour lapping before the CMP process and also, to a lesser degree, by the mechanical action of the compressed compliant pad.

Referring to FIG. 3, there is shown a schematic cross-sectional (perpendicular to the length of the row bar) view (50) through one of a plurality of row bars of sliders (also (50) in FIG. 2) that are fastened to the underside of the lapping fixture (130) on a polyurethane rubber layer (65), showing the cross-section of one slider on one such row bar contacting and compressing the porous, compliant CMP pad (20). Note that several row bars in parallel can efficiently be processed simultaneously using this method. Arrows (85) indicate the downward force due to the weighted fixture. Arrows (30) indicate the direction of motion of the pad relative to the slider. The pad moves into the trailing edge (40) of the slider. Arrows (95) indicate the upward force resulting from the compression of the compliant pad. Arrows (75) indicate the enhanced force exerted on the trailing edge of the slider as a result of the motion and compression of the pad. An alkali water/glycol mixture lubricant, indicated by shading (90), has been sprayed onto the pad surface and the pad also is pre-treated with a polymer solution (not shown). For exemplary purposes of this preferred embodiment, the compliant CMP pad is type Politex HI II Supreme, consisting of a porous polymeric pad (termed "poromeric" by the purveyor) impregnated with polymeric microelements, commercially available from Rohm and Haas Co. A further description of this exemplary pad and its impregnate is to be found in Reinhardt et al. (US Published Patent Application 2004/0224142), particularly in paragraphs [0011] and [0033] thereof, which application is incorporated herein in its entirety by reference. It is to be noted that the pad comprises a felt substrate whose upper surface is provided with a "poromeric coating," i.e. rendered porous and in the form of a polymeric matrix, by the application of the impregnate as described in the patent application cited above. The present inventors have found that the nature of the porosity of the polymeric surface allows for a more consistent flow of chemicals between the pad and the row bar material being polished and, thereby, produces a more uniform material removal from the contact surface occurs. It is further noted that the inventors have found that the use of other pads, such as pads having a fibrous surface rather than a porous surface, does not produce the results that are consistent with the objects of this invention. It is further noted, that the Politex pad used in this preferred embodiment is exemplary and that other compliant CMP pads of a similar surface porosity should achieve the objects of the present invention.

The aqueous alkali lubricant, which is used in conjunction with the porous pad to achieve the objects of the invention, is acquired from Engis Co., part number L6037, which consists of an ethylene glycol/water mixture and other proprietary materials. It is noted that other aqueous alkaline lubricants, having the specific chemical properties described below, will also accomplish the objects of the present invention.

The percentage in weight of ethylene glycol ranges between approximately 60% and 100%. The chemical pH of the solution is measured to be approximately 9.750. It is an aqueous alkaline (basic) solution that chemically reacts with oxide materials, but not with the metal portions such as the NiFe and CoNiFe of the shields and magnetic yoke and read head layers. When applied to the ABS of the sliders in accord with the present invention, the aluminum oxide ($Al_2O_3$, alumina) overcoat that is formed to a thickness of approximately 0.035 mm on the ABS (ie. on surface portions of the overcoat, in other insulation materials below the shield of the read/write head and in other portions of the slider body), are softened and then removed by the moving, compressional contact with the compliant pad. It is important to note that no abrasive materials are required to remove the softened oxides, the inherent abrasiveness of the polymerically pre-treated porous compliant pad is sufficient to remove the softened material. It is also noted in this regard that the motion of the trailing edge of the slider (40) into the compliant pad as shown in FIG. 3 (the pad compresses approximately 35%) enhances the lapping (removal) rate at the trailing edge of the slider and reduces it at the leading edge (arrows, (75)). Motion in the opposite direction produces a lesser oxide recession. When moving in the direction shown, a slanting contour is produced in which the very tip of the trailing edge (place at which arrows (75) contact the trailing edge) is at the lowest point and the highest point is inward towards the leading edge, near the pole tip of the write head. In addition, it is further noted that the aqueous nature of the lubricant dissipates charges and thereby eliminates possible problems with electrostatic charge buildup and associated discharge damage.

Overall, the degree of chemical-mechanical polishing and lapping to produce the required overcoat and alumina recession requires control of the pad compressibility, the load applied, the plate rotational speed and the fixture oscillatory speed, the aqueous alkali lubricant type and lapping time. The CMP process described herein for recession control of overcoat and read/write head portions of the slider is a process in which time is the controlling factor.

Finally, after completion of the CMP process described above, the polished and alumina-recessed slider can be advantageously treated with a plasma enhanced vapor deposition process (using methane and ethane gases) that coats the ABS with a smooth, diamond-like carbon based thin film coating. Said thin film coating is found to protect the slider surface from wear during subsequent HDD operations.

Testing of a Preferred Embodiment

A study applying the present CMP method to exemplary sliders was undertaken and measurement of the overcoat, writer shield and read gap relative heights (relative to the slider surface) after the application of the method indicates that overcoat removal (recession) is the largest of these, being nearly 5.0 nm. Measurement of top shield and read gap recession did not show any significant removal to within the 1 nm margin of error of the measuring device. For the read gap region, this is quite good, as recession of the read gap would produce a loss of resolution in reading the disk tracks. For the top shield, the desired recession can be achieved by the contour lapping process, which is a much smaller recession than is required of the oxide overcoat area. Depending on writer design, the shield thermal protrusion is generally less of a problem (it is much smaller) than the overcoat protrusion and, therefore, requires less of a recession prior to slider usage.

It is also found that the CMP method also removes any diamond scratches caused by the abrasive slurry used during the contour lapping process. This improves the surface smoothness of the slider ABS. The study revealed a 20% improvement in surface smoothness after the CMP process relative to surface smoothness prior to the CMP process.

Finally, the study also showed that the CMP process produced no detectable degradation of read/write head performance.

As is understood by a person skilled in the art, the preferred embodiment of the present invention is illustrative of the present invention rather than being limiting of the present invention. Revisions and modifications may be made to methods, processes, materials, structures, and dimensions through which is formed a slider that does not exhibit thermal protrusion of overcoat and read/write head portions during actual hard disk drive operation, while still providing such a slider, formed in accord with the present invention as defined by the appended claims.

What is claimed is:

1. A method of forming a slider that does not exhibit thermal protrusion of overcoat and read/write head portions during hard disk drive operation comprising:
   providing a plurality of row bars, each row bar including a plurality of sliders formed therein; then
   contour lapping said plurality of row bars to produce a contoured ABS on each slider included therein, each said contoured ABS including portions of a read/write head and each said ABS having an overcoat; then
   applying a non-abrasive, aqueous based CMP process to said plurality of row bars; and
   producing, by the application of said CMP process a chemical softening of said overcoat and a non-abrasive removal of portions thereof, creating thereby a smooth final shape of each said slider ABS, wherein said overcoat and said read/write head portions of each said ABS are recessed relative thereto and any abrasions resulting from said contour lapping are removed; then
   slicing said row bars to produce individual sliders.

2. The method of claim 1 wherein the amount of recession of said overcoat and said read/write head portions is sufficient to eliminate subsequent thermal protrusion of said overcoat and read/write head portions during hard disk drive operation.

3. The method of claim 1 wherein said CMP process comprises:
   providing a lapping device including:
      a rotatable lapping baseplate:
      a weighted lapping fixture above said baseplate, said fixture being capable of radial motion relative to said baseplate;
      a movable guide arm, placed adjacent to said baseplate, to which is attached said fixture, said arm capable of moving said fixture radially above said baseplate in an oscillatory motion;
      a pump and dispenser, fixed adjacent to said baseplate and capable of spraying aqueous solutions onto said baseplate; and
      a polymerically pre-treated porous, compliant CMP pad adhesively fastened to an upper surface of said baseplate; then,
   affixing said first plurality of row bars to an underside of said fixture, each said row bar extending in a radial direction relative to said baseplate, the weight of the fixture causing the ABS of said row bar to compressively contact said compliant pad; then
   rotating said baseplate at a rotational speed in a rotational direction and oscillating said fixture with an oscillatory speed while spraying non-abrasive alkaline aqueous lubricating and chemically softening solution over said compliant pad whereby said overcoat is softened and recessed relative to said ABS.

4. The method of claim 3 wherein said row bars are fastened using an intermediate polyurethane layer adhesively attached between said row bars and said fixture.

5. The method of claim 3 wherein said baseplate rotates in such a direction that said CMP pad moves across said row bar from a trailing edge to a leading edge.

6. The method of claim 3 wherein said overcoat is an aluminum oxide overcoat.

7. The method of claim 3 wherein said aqueous alkaline solution is a mixture of water and a lubricant, said solution having a pH of between approximately 9 and 10.

8. The method of claim 3 wherein said aqueous alkaline solution is a mixture of water and ethylene glycol.

9. The method of claim 3 wherein said CMP pad comprises a polymeric matrix impregnated with a plurality of polymeric microelements.

10. The method of claim 3 wherein the degree of recession is controlled by the choice of rotational speed, the choice of oscillatory speed and the direction of rotation relative to the row bar.

11. The method of claim 3 wherein said read/write head portions are not softened by said aqueous alkaline solution but are primarily recessed by said contour lapping and only partially recessed by compressional contact with said compliant pad.

12. The method of claim 1 further including the coating of said slider ABS with a diamond-like carbon based thin film produced by plasma enhanced vapor deposition of methane and ethane gases.

* * * * *